United States Patent
Yavitz

[11] Patent Number: 5,490,624
[45] Date of Patent: Feb. 13, 1996

[54] TIPPET TAMER

[76] Inventor: Edward Q. Yavitz, 3828 Spring Creek Rd., Rockford, Ill. 61114

[21] Appl. No.: 227,269

[22] Filed: Apr. 13, 1994

[51] Int. Cl.⁶ ................................................ B65H 16/02
[52] U.S. Cl. ................................. 225/34; 225/61; 225/63; 242/594.300
[58] Field of Search .................... 225/34, 61, 63, 225/62, 77, 78, 47; 83/650; 242/594.3, 594.4

[56] References Cited

U.S. PATENT DOCUMENTS

| | | |
|---|---|---|
| 185,864 | 1/1977 | McMillan . |
| 233,131 | 10/1880 | Auchincloss ........................... 225/34 |
| 283,340 | 4/1986 | Moser . |
| 462,622 | 11/1891 | Cate ........................................ 225/61 |
| 589,341 | 8/1897 | Dodd . |
| 966,650 | 8/1910 | Bueb . |
| 972,160 | 10/1910 | Canham . |
| 1,010,357 | 11/1911 | Forst ...................................... 83/650 |
| 1,044,014 | 11/1912 | Butts ...................................... 225/63 |
| 2,058,536 | 10/1936 | Waseen . |
| 3,428,929 | 2/1969 | Brown et al. . |
| 4,537,106 | 8/1986 | Rider ...................................... 83/650 |
| 4,953,810 | 9/1990 | Stadig . |
| 5,154,336 | 10/1992 | Quellet ................................... 225/78 |

*Primary Examiner*—Kenneth E. Peterson
*Attorney, Agent, or Firm*—Foley & Lardner

[57] ABSTRACT

A post for separately supporting, separating and labeling a number of spools of thread, wire or fishing line, the post being formed of a resilient material such as rubber with a number of rings spaced at a distance from each other greater than the width of the spools. The spools having a central opening slightly greater than the diameter of the post but less than the outer diameter of the flexible spacer rings. The spools are separated rotationally from each other by the spacer rings. Alternatively, a groove is provided around the inside surface of the central spool openings for engaging each of the rings on the post. A disk is mounted on one end of the post and includes a number of notches for labeling and engaging the base end of the thread, wire or line from each spool. One notch includes a blade for cutting off the end of the thread, wire or line. A hole in the opposite end of the post is provided to secure the entire device to the fisherman's vest.

10 Claims, 1 Drawing Sheet

TIPPET TAMER

FIELD OF THE INVENTION

The present invention relates to tippet reels and more particularly to a holder for supporting a number of the reels of thread, wire or fishing line of different size and/or color.

BACKGROUND OF THE INVENTION

A "tippet" as used herein refers to a short piece of thread, fishing line or wire which is used by a seamstress, fisherman or electrician for mending clothes, tying a fly to a fishing hook or repairing an electrical wire. Thread, fishing line and wire are generally stored on reels or spools which are loosely carried in a bag, tackle box or tool box. When a particular size or color is required a search must be made to find the desired spool, very often the thread, fishing line or electric wire is partially unwound and often tangled with other spools of similar material.

SUMMARY OF THE PRESENT INVENTION

The spool holder of the present invention is designed to hold spools of thread, wire or fishing line arranged in size and/or color. The spool holder is in the form of a post having a disk at one end which includes a number of slots or notches for anchoring the ends of the thread, wire or fishing line, one of the slots or notches is provided with a blade to cut off a length of the desired material. The spool holder may be provided with an opening at one end for attaching the holder to a necklace or belt.

One of the primary advantages of the tippet tamer according to the invention is the convenience in selecting or finding the right reel or spool for the job to be done.

A further advantage is provided by securing a disk having a number of slots to one end of the post for anchoring the ends of the thread as well as a V shaped cutting slot for cutting off a desired length of thread, wire or line.

A further advantage of the tippet tamer is the time saved in identifying the color or size of the thread desired.

Another advantage of the invention of the tippet tamer is the provision of an opening at one end of the spool to accommodate a necklace tie line or belt for carrying the tippet tamer.

Other principal features and advantages of the invention will become apparent to those skilled in the art upon review of the following drawings, the detailed description and the appended claims.

Figure 1:
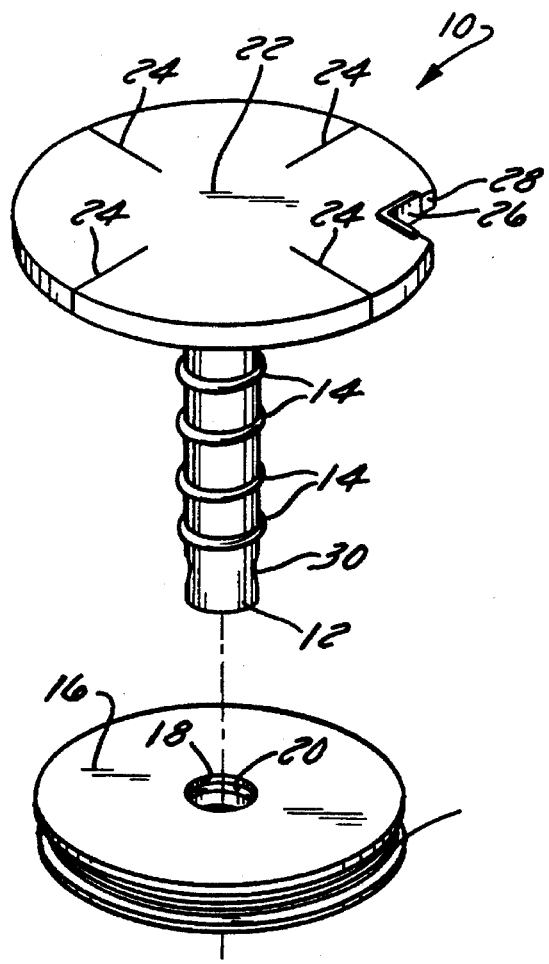
FIG. 1 is a perspective view of the spool holder with a spool shown aligned on the holder.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
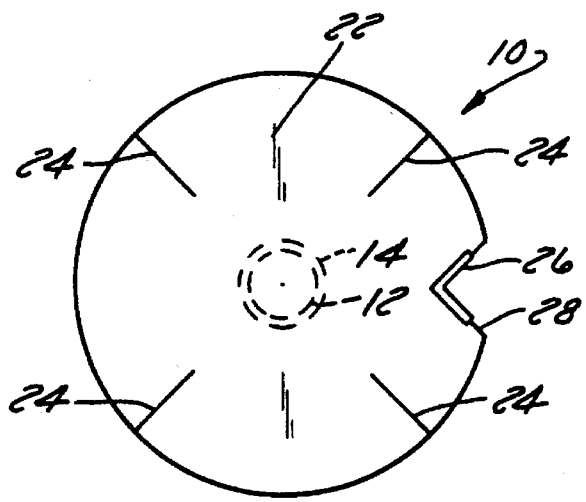
FIG. 2 is a top view of the holder showing the disk for supporting the ends of the thread, line or wire.
Figure 3:
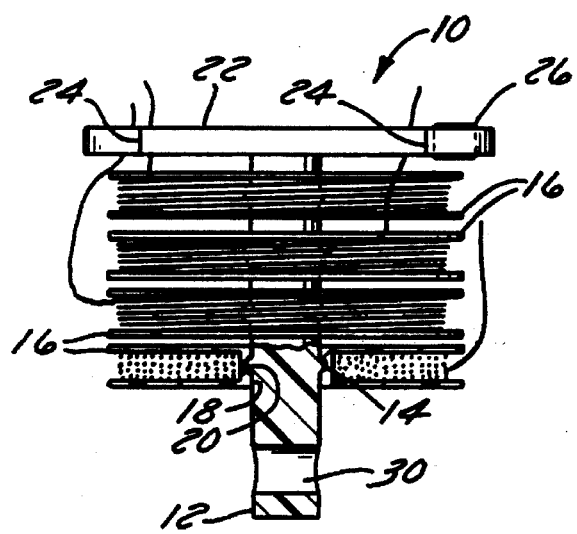
FIG. 3 is a side view of the holder shown partly in section with the spools aligned with the ribs.

The spool holder 10 according to the present invention as shown in FIGS. 1 through 3, generally includes a post 12 formed from a resilient material such as rubber. The post 12 can be used to hold a number of spools 16 of thread, wire or fishing line. A number of circular ribs 14 are formed at spaced intervals on the post to isolate the spools, one from the other. The spools 16 are provided with a hole or opening 18 having a diameter greater than the diameter of the post but smaller than the diameter of the ribs 14. The spools 16 can be pushed unto the spool over the resilient ribs 14 into the space between the ribs so that the spools are spaced from each other.

Alternatively, the spools may be provided with a groove 20 in the center of the opening 18 in the spool. The spools can be pushed over the resilient ribs 14 with the groove 20 aligned on the ribs 14. The spools will be spaced apart sufficiently so that the adjacent spools remain fixed when the adjoining spool is rotated to cut a length of the line.

Means are provided on one end of the post for frictionally holding the ends of the thread, wire or fishing line (hereinafter thread), to prevent unwinding of the thread from the spool. Such means is in the form of a disk 22 having a number of notches 24 provided in the periphery of the disk 22 corresponding to the number of spools mounted on the post. The loose end of the thread can be anchored in the slot in the disk by merely pulling the thread into the slot. The size of the thread, fishing line or wire can be marked on the disk for easy identification.

Means are also provided on the edge of the disk 22 to cut off a length of thread from the spool. Such means is in the form of a steel blade 26 embedded in the end of a V shaped notch 28 provided on the periphery of the disk 22. After the thread has been cut the loose end of the thread can be returned to the appropriate slot in the disk.

A hole 30 may be provided in the end of the post 16 which can be used to support the spool on a necklace, tie line or belt for easy access to the user.

Thus, it should be apparent that there has been provided in accordance with the present invention a tippet tamer that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A post for supporting a number of spools of thread, fishing line or wire, comprising a resilient post having a number of ribs spaced at equal intervals along a length of the post, a number of spools each having an opening with a diameter corresponding to an outer diameter of the post, a flat disk mounted at one end of the post, said disk having a number of notches radially spaced around a periphery of the disk for frictionally securing ends of the thread on the spools to the disk, one of said notches having a blade for cutting the thread, line or wire, to a desired length.

2. The spool holder according to claim 1 wherein said spools are spaced from each other by said ribs.

3. The spool holder according to claim 1 wherein said spools each include a central opening and a notch in said opening for engaging the ribs formed on a surface of the post, said spools being arranged at equal intervals for separating the spools one from the other.

4. The spool holder according to claim 3 including a hole in an other end of the post for carrying the post on a necklace, tie line or belt.

5. A tippet tamer comprising:

a post for supporting a number of spools of thread, fishing line or wire, comprising a resilient post having a number of ribs spaced at equal intervals along a length of the post a disk mounted on one end of the post, said disk having a number of notches radially spaced around the periphery of the disk for frictionally securing ends of the thread on the spools to the disk a number of spools of thread, wire or fishing line rotatably mounted on the post, and means for retaining the spools on the post.

6. The tamer according to claim 5 wherein said disk includes a blade in the disk for cutting the thread, wire or fishing line.

7. The tippet tamer according to claim 6 including means for spacing the spools on the post whereby a rotation of one spool will not rotate an adjacent spool.

8. A fishing line holder for supporting a plurality of spools of fishing line, comprising:

a resilient post having a plurality of ribs spaced at equal intervals along a length of the post to support the plurality of spools, a plate mounted at one end of the post, the plate having a plurality of holders, each holder being configured to hold a strand of fishing line extending from one of the plurality of spools, and a stationary cutter mounted to at least one of the post and the plate for cutting the strands of fishing line.

9. The fishing line holder as recited in claim 8, wherein the plate is a disk and the cutter includes a blade mounted in the disk.

10. The fishing line as recited in claim 8, wherein each holder is a notch in the plate configured to frictionally hold the strand.

\* \* \* \* \*